Jan. 25, 1955   J. H. STARR   2,700,330
CULTIVATOR

Original Filed March 20, 1948   2 Sheets-Sheet 1

INVENTOR.
JOHN H. STARR
BY
*O. T. Parker & C. Johnson*
ATTORNEYS

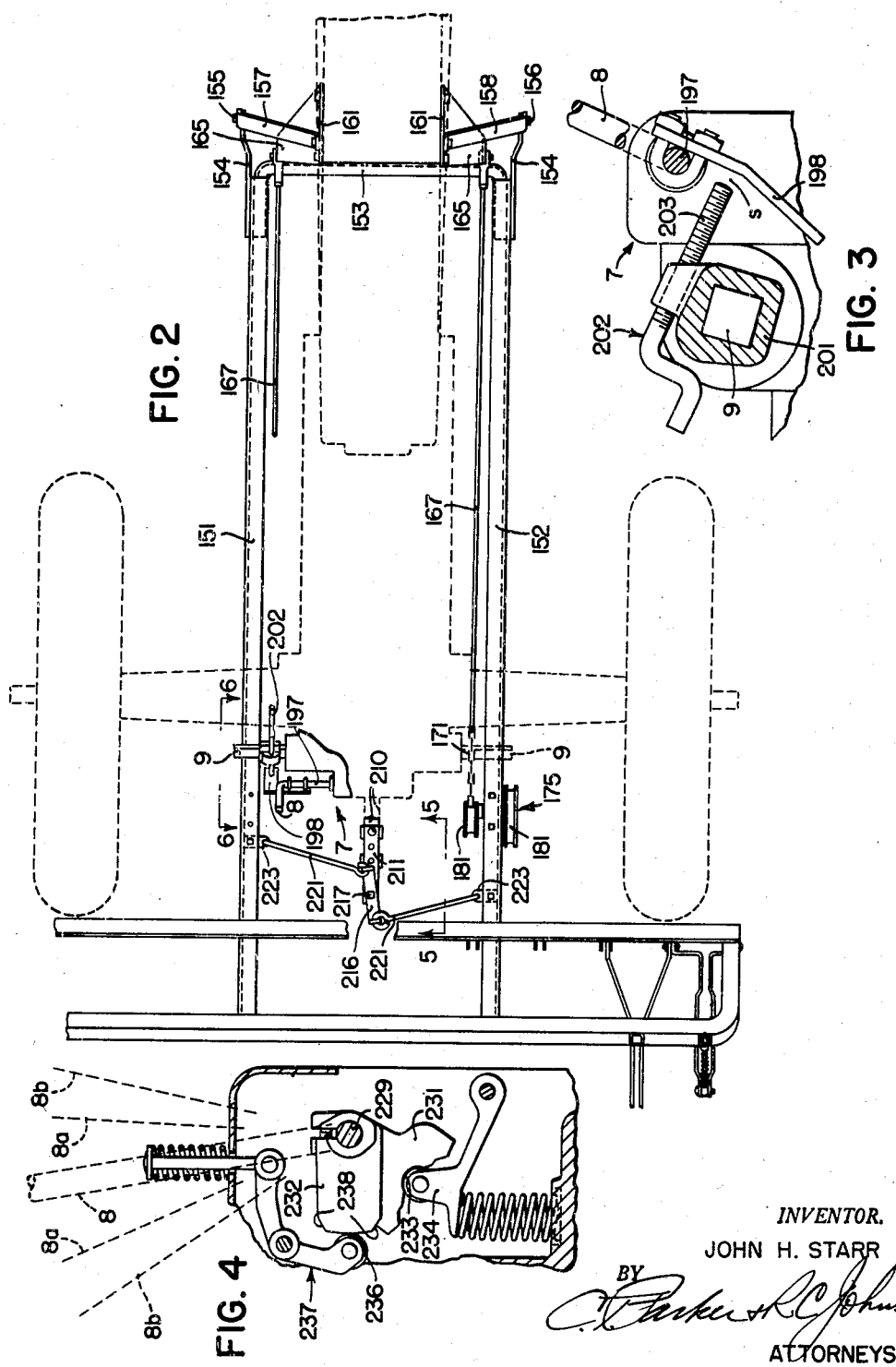

United States Patent Office 2,700,330
Patented Jan. 25, 1955

2,700,330

CULTIVATOR

John H. Starr, Mayville, Wis., assignor to John Deere Van Brunt Company, Horicon, Wis., a corporation of Wisconsin Original application March 20, 1948, Serial No. 16,047, now Patent No. 2,626,547, dated January 27, 1953. Divided and this application January 12, 1952, Serial No. 266,228

1 Claim. (Cl. 97—46.59)

This application is a division of my co-pending application, Serial No. 16,047, filed March 20, 1948, for Cultivators, now U. S. Patent 2,626,547, issued January 27, 1953.

The present invention relates generally to agricultural implements and more particularly to implements that are adapted to be mounted on a tractor to be propelled thereby and controlled by the operator on the tractor.

The object and general nature of the present invention is the provision of an agricultural implement, particularly adapted for use with tractors having a power lift unit and wherein the connections are such that operation of the power lift unit serves to control the depth of operation, which is substantially maintained, and may also be utilized to raise the tools into their transport position easily and rapidly.

More specifically, an important feature of this invention is the provision of new and improved connections with the tractor power lift system whereby the implement may automatically be lowered each time to a given working position but the connections are so constructed and arranged as to provide for additional lowering by the tractor power lift mechanism, where desired.

These and other objects and advantages of the present invention will be apparent to those skilled in the art after a consideration of the following detailed description, taken in conjunction with the accompanying drawings.

In the drawings:

Figure 2 is a plan view of the implement shown in Figure 1.

Figure 3 is a fragmentary side view of a portion of the automatic depth control, taken generally along the line 6—6 of Figure 2.

Figure 4 is an explanatory view of the tractor power lift valve unit.

Figure 1:
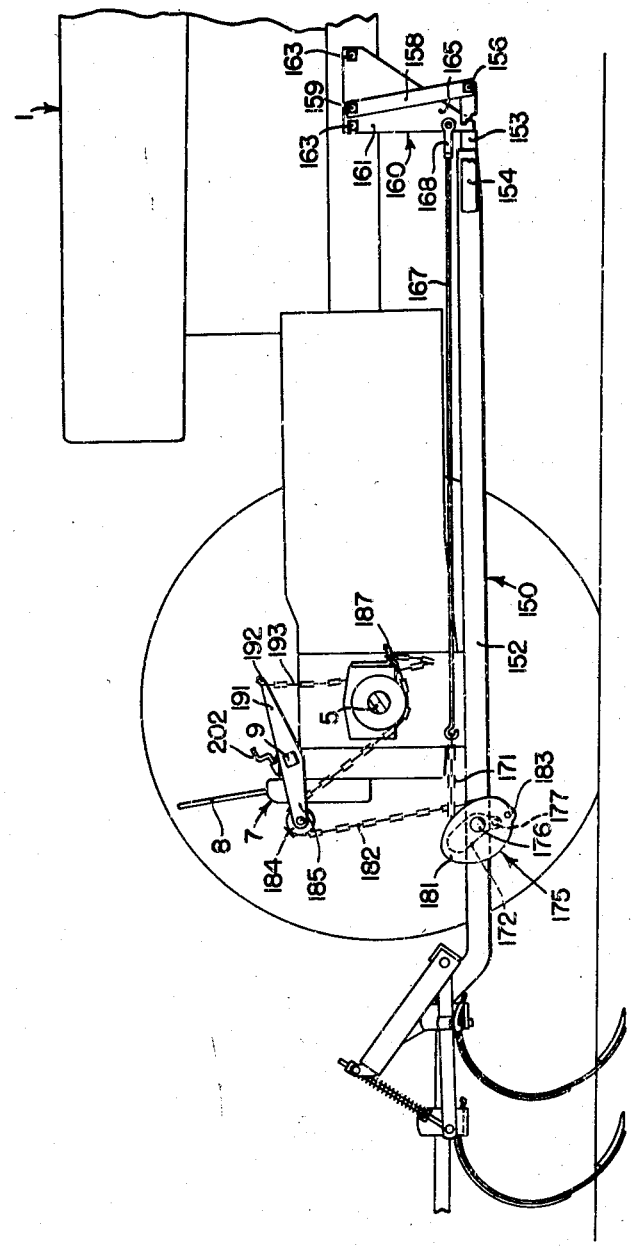
Figure 1 is a side view of the rear portion of a tractor mounted field cultivator in which the principles of the present invention have been incorporated.

Referring now to the drawings, particularly Figures 1 and 2, the tractor on which the implement of the present invention is mounted is indicated in its entirety by the reference numeral 1 and so far as the present invention is concerned is largely conventional. The tractor 1 is provided with a frame containing or supporting a power plant, such as a gasoline engine, and is carried on front wheels (not shown) and a pair of relatively widely spaced rear traction wheels fixed to axle shafts 5 that are journaled for rotation in a rear axle structure. The tractor 1 is also provided with a power lift unit 7 which includes suitable operating mechanism, including a valve control member in the form of an operating lever 8, and a lifting member in the form of a rockshaft 9 on which power lift arms are secured for movement between a lowered position and an upper or raised position.

The operating unit or implement chosen to illustrate the present invention is shown as a spring tooth field cultivator indicated in its entirety by reference numeral 20. The cultivator 20 incorporates a frame 150 which includes right and left hand generally longitudinally extending frame bars, preferably in the form of angles indicated at 151 and 152, the rear ends of which are turned upwardly, forming upwardly and rearwardly angled sections to which the cross bars and other parts of the cultivator 20 are connected. The present invention is not concerned with the particular details of the ground working elements of the cultivator 20, since they are old per se.

In the illustrated form of the present invention, the two angle bars 151 and 152 are connected together at their forward ends by a U-shaped angle bar 153. Also connected to the front ends of the frame bars 151 and 152 is a pair of hitch straps 154. The forward ends of the hitch straps are apertured to receive bolts 155 and 156 by which the frame 150 is connected to a pair of fore and aft swingable hitch links 157 and 158. The upper ends of the links are pivotally connected, as at 159, to a draft bracket structure 160, preferably comprising a pair of vertical plates 161 detachably connected, as by bolts 163, to the side angles of the tractor frame. The draft brackets 161 are disposed laterally outwardly at their lower ends, as indicated at 165, to form convenient connection points by which the front ends of a pair of draft links 167 may be pivotally connected therewith, as by an adjustable swivel 168. By virtue of the forward side of the transverse frame angle 153 contacting the lower portions 165 of the brackets 151, the frame 158 is prevented from swinging forwardly far enough to permit the frame bar 25 to strike the rear tires of the tractor. The frame 150 is free to swing rearwardly.

The rear ends of the draft links 167 are connected to the front ends of chains 171, and the rear end of each of the chains 171 is connected to a cam element 172 which forms a part of a rotatable cam member 175 mounted for rocking, as at 176, on the associated frame bar. The rear end of the chain 171 is connected to the cam element 172 by a pin or the like, as indicated at 177 in Figure 3.

Each of the cam members 175 includes a second cam element 181 to which the lower end of a chain 182 is connected, as at 183. Each of the chains 182 extends upwardly from the cam member 175 over the roller 184 mounted on the rear end of an arm 185 which is fixed to the rear end of the power lift rockshaft 9. The forward end of the chain 182 extends underneath the associated rear axle extension and is adjustably engaged with a hook member 187 that is fixed to the forward side of the axle housing at that side of the tractor. Each of the power lift arms 185 is extended forwardly, as at 191, and is formed with a forward hooked end 192 to which a limit chain 193 is connected, the lower end of the chain 193 being engaged with the hook 187. Preferably, the chain 193 has a sufficient number of additional links so that when engaging any one of a number of links at either end of the chain with the associated hook section, 187 or 192, the downward movement of the associated power lift arm 185, counterclockwise as best shown in Figure 1, may be limited, as desired.

In the instant form of invention, the shaft portion 197 of the valve lever 8 of the power lift unit 7 includes or carries movable means in the form of an abutment plate 198, preferably clamped thereto as shown in Figure 3. The adjacent end of the power lift rockshaft 9 carries a collar 201 or other suitable means which is provided with an adjusting member 202, preferably in the form of a threaded crank member having an inner end 203 that is adapted to engage the abutment 198 when the power lift rockshaft is moved into a lowered position, the abutment of the member 203 against the part 198 and subsequent movement of the member 203 serving to automatically return the valve member 8 to a neutral position, terminating further lowering of the power lift rockshaft 9. Turning the member 202 into different positions will result in the automatic termination of the lowering movement at different points, thus resulting in the implement always being lowered to the same point for any given adjustment of the member 202. The parts are shown in their lowered position in Figure 3.

The present invention is not especially concerned with the particular details of the power lift unit 7 and therefore it will be sufficient for purposes of description of the present invention to note that the power lift unit 7 is of the type in which the first portion of the movement of the valve control lever 8 in either direction produces a relatively slow movement of the rockshaft 9, whereas a greater extent of movement of the control lever 8 produces a relatively fast movement of the rockshaft 9. It will also be noted that the abutment plate 198 is so disposed relative to the adjustable abutment 202 carried by the rockshaft 9 that after the end 203 has contacted the abutment plate 198 and returned the valve lever 8 to its neutral position there is still sufficient space, indicated by the reference character s in Figure 3, to provide for additional movement of the valve lever 8 in slow speed range.

This action will be understood more readily by reference to Figure 4 in which a portion of the valve mechanism is shown. Referring now to Figure 4, it will be noted that the control lever 8 is fixed to or forms a part of a control rockshaft 229 to which a pair of cam members 231 and 232 are connected. The cam member 231 is provided with a central recessed section 233 into which a spring pressed plunger 234 is normally disposed. Movement of the valve lever 8 out of its neutral position but within its slow speed range, as indicated by a broken line 8a, is yieldingly resisted by the spring pressed plunger 234, and the latter member acts to automatically return the valve lever 8 to its central and neutral position as soon as the operator releases his hold. However, movement of the valve lever 8 into its high speed lifting range, as indicated by the positions 8b, causes the roller 236 on a second spring pressed unit 237 to engage one or the other of the corner portions 238 of the cam member 232. This engagement is arranged to hold the valve lever 8 in its high speed position against the action of the spring pressed plunger unit 234. However, a slight movement of the valve lever 8 in its high speed position toward its neutral position is sufficient to cause the shouldered portions 38 to ride away from the roller 236, whereupon the spring pressed unit 234 then acts automatically to return the valve lever 8 to its neutral position. The action of the adjustable member 202 in engaging the abutment member 198 thus serves to return the valve lever 8 from its high speed position to its neutral position, but leaving sufficient space s for subsequent movement of the valve lever 8 into and out of its slow speed range 8a, 8a. Thus, the member 202 may be adjusted to automatically stop the lowering of the rear tools at a given point but to yet provide for some additional lowering under the manual control of the operator.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

In an agricultural implement adapted to be connected with a tractor having a hydraulic power lift unit including a lifting member, a control valve member movable from a neutral position into a slow operating position and a fast operating position for operating said lifting member, resilient means for automatically returning the control member to its neutral position from its slow operation position, and means for releasably holding said control member in its fast operating position, the combination therewith of an implement adapted to be movably connected with the tractor, means for connecting said lifting member with said implement, an abutment movable with and adjustable on the lifting member for shifting said valve control member from its fast operating position into its neutral position for terminating movement of said implement operating unit, there being sufficient space between said abutment member and the adjacent portion of said valve control member to provide for subsequent movement of said valve control member from its neutral position into its slow operating position, an extension detachably connectible to said control valve member, and said abutment member comprising a part connectible to move with said lifting member and a screw-threaded adjustable section movably carried by said part.

References Cited in the file of this patent
UNITED STATES PATENTS

| | | |
|---|---|---|
| 1,929,804 | Brown | Oct. 10, 1933 |
| 2,532,552 | Jirsa et al. | Dec. 5, 1950 |
| 2,566,779 | Stutzke | Sept. 4, 1951 |